(12) United States Patent
Tombs et al.

(10) Patent No.: US 8,358,957 B2
(45) Date of Patent: *Jan. 22, 2013

(54) SELECTIVE PRINTING OF RAISED INFORMATION BY ELECTROGRAPHY

(75) Inventors: Thomas Nathaniel Tombs, Rochester, NY (US); Arun Chowdry, Pittsford, NY (US); Hwai-Tzuu Tai, Rochester, NY (US); Dinesh Tyagi, Fairport, NY (US); Muhammed Aslam, Rochester, NY (US); Earl Gregory Gomes, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 511 days.

This patent is subject to a terminal disclaimer.

(21) Appl. No.: 11/646,134

(22) Filed: Dec. 27, 2006

(65) Prior Publication Data

US 2008/0159786 A1 Jul. 3, 2008

(51) Int. Cl.
*G03G 15/01* (2006.01)
(52) U.S. Cl. ........................................ 399/223; 399/231
(58) Field of Classification Search .................. 399/222, 399/223, 231, 224
See application file for complete search history.

(56) References Cited

U.S. PATENT DOCUMENTS

| | | | |
|---|---|---|---|
| 2,955,035 A | 10/1960 | Walkup et al. | |
| 2,955,052 A | 10/1960 | Carlson et al. | |
| 3,121,009 A | 2/1964 | Giamo, Jr. | |
| 3,207,601 A | 9/1965 | Giamo, Jr. | |
| 3,589,290 A | 6/1971 | Walkup et al. | |
| 3,924,019 A * | 12/1975 | Jacob | 430/124.1 |
| 4,268,615 A | 5/1981 | Yonezawa | |
| 4,694,185 A | 9/1987 | Weiss | |
| 4,833,060 A | 5/1989 | Nair et al. | |
| 4,965,131 A | 10/1990 | Nair et al. | |
| 5,122,430 A | 6/1992 | Nishitsuji et al. | |
| 5,240,335 A | 8/1993 | Itoh et al. | |
| 5,543,964 A | 8/1996 | Taylor et al. | |
| 5,563,694 A * | 10/1996 | Katayama | 399/2 |
| 5,583,694 A | 12/1996 | Takahashi et al. | |
| 5,707,684 A | 1/1998 | Hayes et al. | |
| 5,715,383 A | 2/1998 | Schindler et al. | |
| 5,745,152 A | 4/1998 | Vincent et al. | |
| 5,779,482 A * | 7/1998 | Fukumoto | 434/113 |
| 6,165,667 A | 12/2000 | Takagi et al. | |
| 6,421,522 B2 | 7/2002 | Henderson et al. | |
| 6,521,905 B1 | 2/2003 | Luxem et al. | |
| 6,591,747 B2 | 7/2003 | Buch et al. | |

(Continued)

FOREIGN PATENT DOCUMENTS

DE 1002005010506 9/2006

(Continued)

OTHER PUBLICATIONS

Machine translation of JP 08-063039.*

(Continued)

*Primary Examiner* — Walter L Lindsay, Jr.
*Assistant Examiner* — Barnabas Fekete (57) ABSTRACT

Electrographic printing wherein raised information, with a distinct tactile feel, can be printed by electrographic techniques. Such electrographic printing comprises the steps of forming a desired print image, electrographically, on a receiver member utilizing standard size marking particles; and in an area of the formed print image, where desired tactile feel, raised information is to be formed, selectively forming such tactile feel, raised information utilizing marking particles of a substantially larger size than the standard size marking particles of the desired print image.

6 Claims, 7 Drawing Sheets

U.S. PATENT DOCUMENTS

| | | |
|---|---|---|
| 6,663,103 B2 | 12/2003 | Dobberstein et al. |
| 6,734,449 B2 | 5/2004 | Peter et al. |
| 6,791,590 B2 | 9/2004 | Misaizu et al. |
| 6,795,250 B2 | 9/2004 | Johnson et al. |
| 6,993,269 B2 | 1/2006 | Yamauchi et al. |
| 7,139,521 B2 | 11/2006 | Ng et al. ................. 399/341 |
| 7,313,354 B2* | 12/2007 | Tsuda et al. ............. 399/341 |
| 2004/0032601 A1* | 2/2004 | Ishii et al. ............... 358/1.9 |
| 2004/0033085 A1 | 2/2004 | Misaizu et al. |
| 2005/0169680 A1 | 8/2005 | Ng et al. |
| 2005/0207807 A1* | 9/2005 | Tombs ..................... 399/341 |
| 2006/0110194 A1* | 5/2006 | Emmert et al. .......... 399/341 |
| 2006/0133870 A1 | 6/2006 | Ng et al. ................. 399/341 |
| 2006/0187505 A1 | 8/2006 | Ng et al. ................. 358/518 |
| 2006/0188295 A1* | 8/2006 | Kasiske et al. .......... 399/182 |

FOREIGN PATENT DOCUMENTS

| | | |
|---|---|---|
| EP | 1392046 | 2/2004 |
| JP | 08-63039 | 3/1996 |
| JP | 08063039 | 3/1996 |
| JP | 10 224581 | 8/1998 |
| JP | 2002278370 | 9/2002 |
| JP | 2004074422 | 3/2004 |
| WO | WO 99/36830 | 7/1999 |
| WO | WO 2005/121893 | 12/2005 |
| WO | WO2008/082648 | 7/2008 |

OTHER PUBLICATIONS

Van. H. DuBois and F.W. John, eds., in Plastics, 5th edition, Van Norstrand and Reinhold, 1974 (p. 522).

* cited by examiner

SELECTIVE PRINTING OF RAISED INFORMATION BY ELECTROGRAPHY

FIELD OF THE INVENTION

This invention relates in general to electrographic printing, and more particularly to selectively printing of tactile feel, raised information by electrography.

BACKGROUND OF THE INVENTION

One common method for printing images on a receiver member is referred to as electrography. In this method, an electrostatic image is formed on a dielectric member by uniformly charging the dielectric member and then discharging selected areas of the uniform charge to yield an image-wise electrostatic charge pattern. Such discharge is typically accomplished by exposing the uniformly charged dielectric member to actinic radiation provided by selectively activating particular light sources in an LED array or a laser device directed at the dielectric member. After the image-wise charge pattern is formed, the pigmented (or in some instances, non-pigmented) marking particles are given a charge, substantially opposite the charge pattern on the dielectric member and brought into the vicinity of the dielectric member so as to be attracted to the image-wise charge pattern to develop such pattern into a visible image.

Thereafter, a suitable receiver member (e.g., cut sheet of plain bond paper) is brought into juxtaposition with the marking particle developed image-wise charge pattern on the dielectric member. A suitable electric field is applied to transfer the marking particles to the receiver member in the image-wise pattern to form the desired print image on the receiver member. The receiver member is then removed from its operative association with the dielectric member and subjected to heat and/or pressure to permanently fix the marking particle print image to the receiver member. Of course, plural marking particle images of, for example, different color particles respectively can be overlaid on one receiver member (before fixing) to form a multi-color print image on the receiver member.

In the earlier days of electrographic printing, the marking particles were relatively large (e.g., on the order of 10-15 μm). As a result the print image had a tendency to exhibit a relief (variably raised surface) appearance. Under most circumstances, the relief appearance was considered an objectionable artifact in the print image. In order to improve image quality, and to reduce relief appearance, over the years, smaller marking particles (e.g., on the order of less than 8 μm) have been formulated and are more commonly used today.

With the improved print image quality, print providers and customers alike have been looking at ways to expand the use of electrographically produced prints. In certain classes of printing, a tactile feel to the print is considered to be highly desirable. Specifically, ultra-high quality printing such as for stationary headers or for business cards utilize raised letter printing to give a tactile feel to the resultant print output. Some other instances where tactile feel in the print would be desirable are Braille prints or print documents, which have security features provided there within. Up to date however, printing documents with raised information so as to have a tactile feel with electrographic techniques, particularly with commonly used small size marking particles, has not been practical, and past printing techniques where large particles were used produced low quality images.

SUMMARY OF THE INVENTION

In view of the above, this invention is directed to electrographic printing wherein raised information, with a distinct tactile feel, can be printed by electrographic techniques. Such electrographic printing comprises the steps of forming a desired print image, electrographically, on a receiver member utilizing standard size marking particles; and in an area of the formed print image, where desired tactile feel, raised information is to be formed, selectively forming such tactile feel, raised information utilizing marking particles of a substantially larger size than the standard size marking particles of the desired print image.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DETAILED DESCRIPTION OF THE INVENTION

Figure 1:
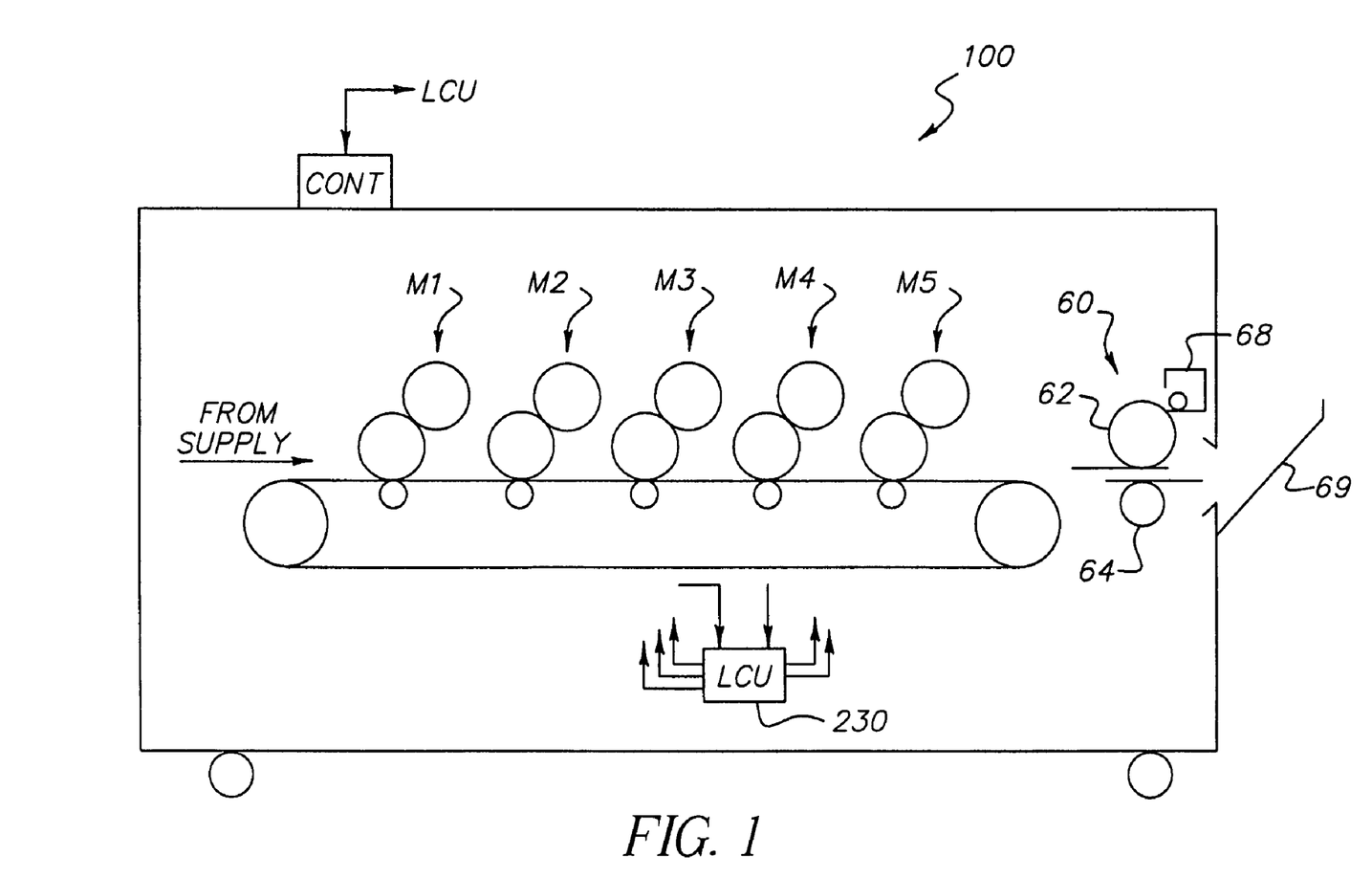
FIG. 1 is a schematic side elevational view, in cross section, of a typical electrographic reproduction apparatus suitable for use with this invention.
Figure 2:
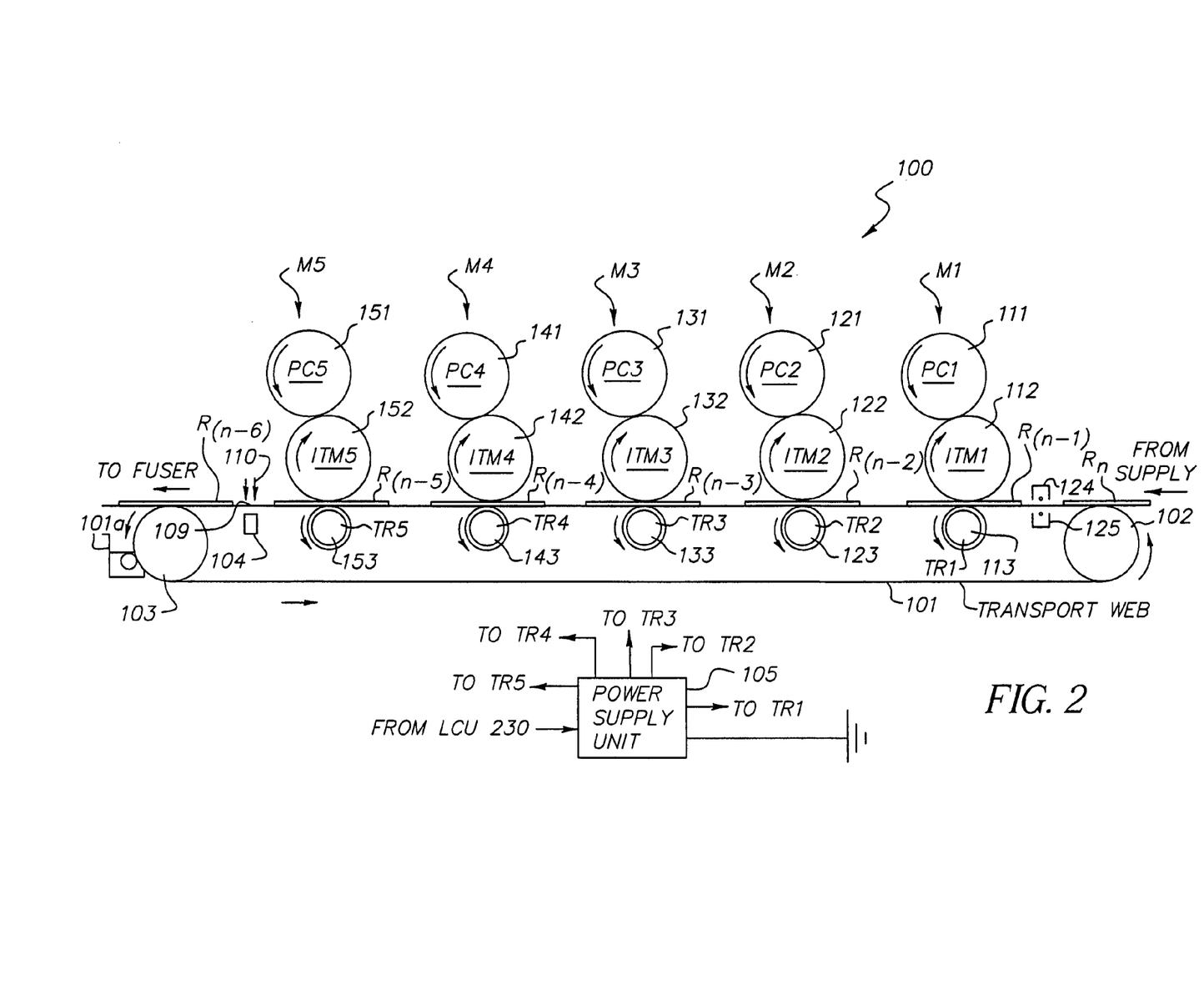
FIG. 2 is a schematic side elevational view, in cross section, of the reprographic image-producing portion of the electrographic reproduction apparatus of FIG. 1, on an enlarged scale.
Figure 3:
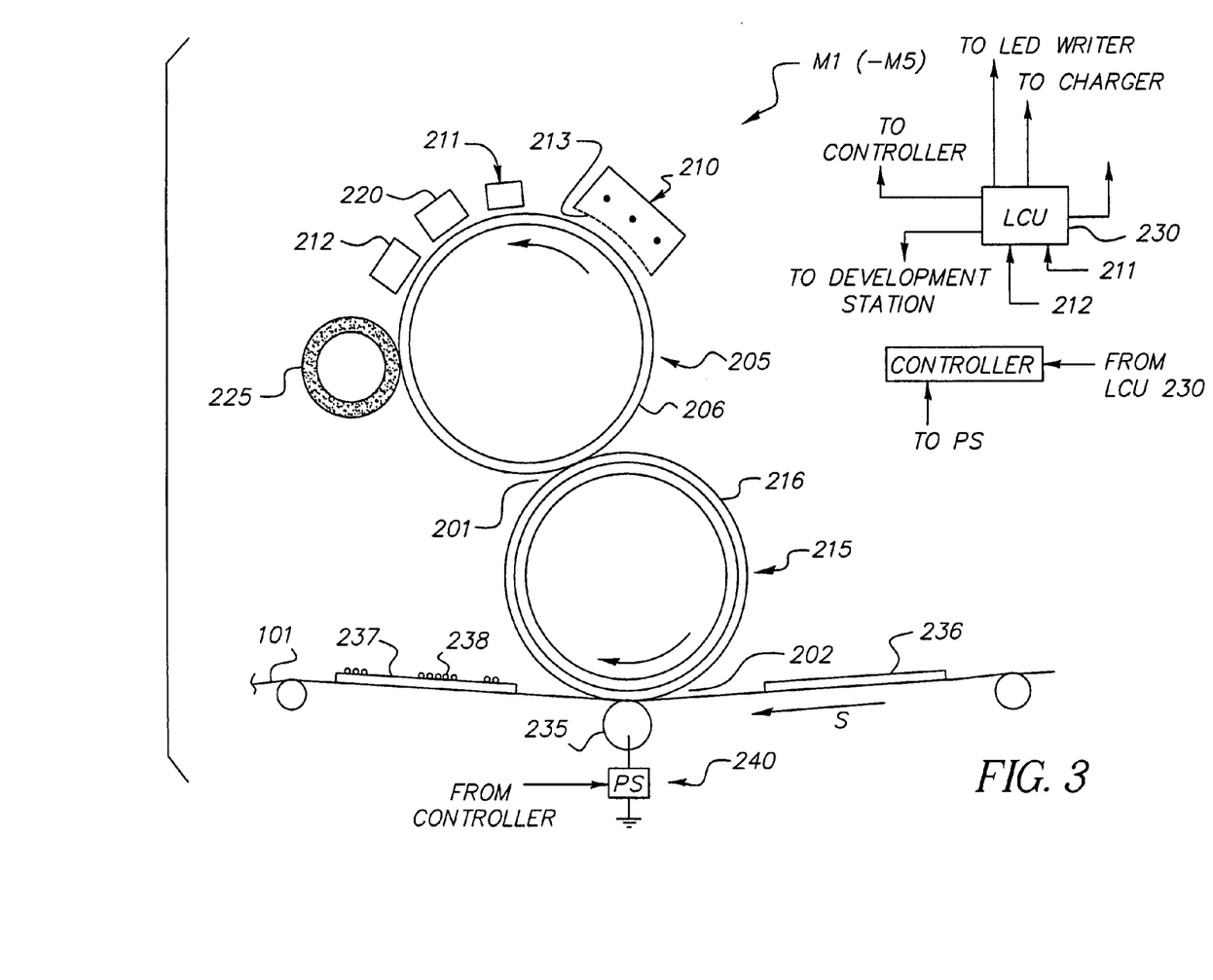
FIG. 3 is a schematic side elevational view, in cross section, of one printing module of the electrographic reproduction apparatus of FIG. 1, on an enlarged scale.
Figure 4:
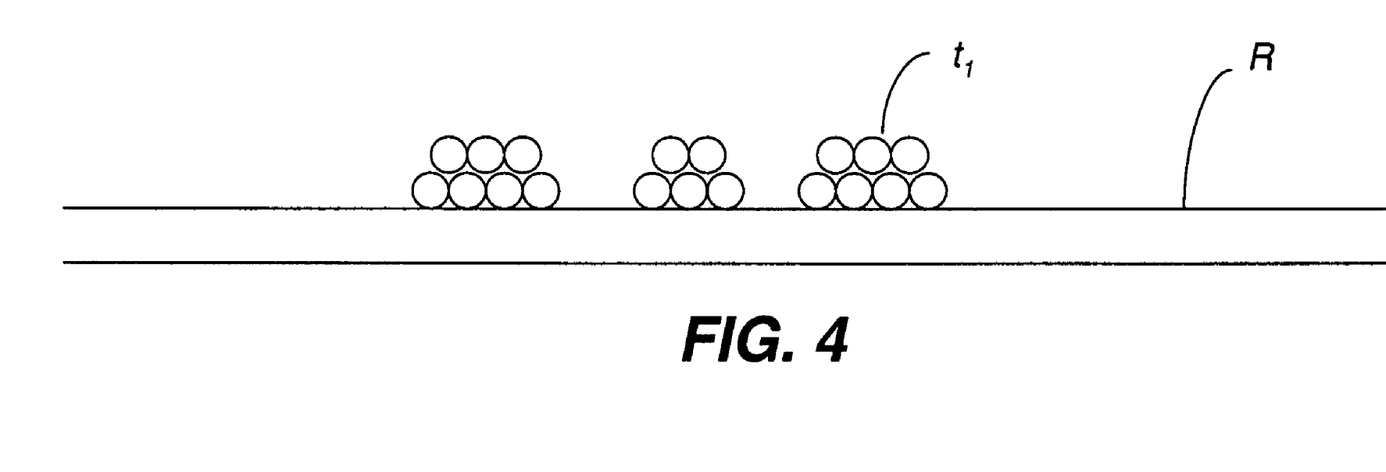
FIG. 4 is a schematic side elevational view, in cross section, of a receiver member having a marking particle print image formed thereon.

Referring now to the accompanying drawings, FIGS. 1-3 are side elevational views schematically showing portions of a typical electrographic print engine or printer apparatus suitable for printing of pentachrome images. Although one embodiment of the invention involves printing using an electrophotographic engine having five sets of single color image producing or printing stations or modules arranged in tandem, the invention contemplates that more or less than five colors may be combined on a single receiver member, or may include other typical electrographic writers or printer apparatus.

An electrographic printer apparatus 100 has a number of tandemly arranged electrostatographic image forming printing modules M1, M2, M3, M4, and M5. Each of the printing modules generates a single-color toner image for transfer to a receiver member successively moved through the modules. Each receiver member, during a single pass through the five modules, can have transferred in registration thereto up to five single-color toner images to form a pentachrome image. As used herein the term pentachrome implies that in an image formed on a receiver member combinations of subsets of the five colors are combined to form other colors on the receiver member at various locations on the receiver member, and that all five colors participate to form process colors in at least some of the subsets wherein each of the five colors may be combined with one or more of the other colors at a particular location on the receiver member to form a color different than the specific color toners combined at that location. In a particular embodiment, printing module M1 forms black (K) toner color separation images, M2 forms yellow (Y) toner color separation images, M3 forms magenta (M) toner color separation images, and M4 forms cyan (C) toner color separation images. Printing module M5 may form a red, blue, green or other fifth color separation image. It is well known that the four primary colors cyan, magenta, yellow, and black may be combined in various combinations of subsets thereof to form a representative spectrum of colors and having a respective gamut or range dependent upon the materials used and process used for forming the colors. However, in the electrographic printer apparatus, a fifth color can be added to improve the color gamut. In addition to adding to the color gamut, the fifth color may also be used as a specialty color toner image, such as for making proprietary logos, or a clear toner for image protective purposes.

Receiver members ($R_n$-$R_{(n-6)}$ as shown in FIG. 2) are delivered from a paper supply unit (not shown) and transported through the printing modules M1-M5. The receiver members are adhered (e.g., preferably electrostatically via coupled corona tack-down chargers 124, 125) to an endless transport web 101 entrained and driven about rollers 102, 103. Each of the printing modules M1-M5 similarly includes a photoconductive imaging roller, an intermediate transfer member roller, and a transfer backup roller. Thus in printing module M1, a black color toner separation image can be created on the photoconductive imaging roller PC1 (111), transferred to intermediate transfer member roller ITM1 (112), and transferred again to a receiver member moving through a transfer station, which transfer station includes ITM1 forming a pressure nip with a transfer backup roller TR1 (113). Similarly, printing modules M2, M3, M4, and M5 include, respectively: PC2, ITM2, TR2 (121, 122, 123); PC3, ITM3, TR3 (131, 132, 133); PC4, ITM4, TR4 (141, 142, 143); and PC5, ITM5, TR5 (151, 152, 153). A receiver member, $R_n$, arriving from the supply, is shown passing over roller 102 for subsequent entry into the transfer station of the first printing module, M1, in which the preceding receiver member $R_{(n-1)}$ is shown. Similarly, receiver members $R_{(n-2)}$, $R_{(n-3)}$, $R_{(n-4)}$, and $R_{(n-5)}$ are shown moving respectively through the transfer stations of printing modules M2, M3, M4, and M5. An unfused image formed on receiver member $R_{(n-6)}$ is moving as shown towards a fuser of any well known construction, such as the fuser assembly 60 (shown in FIG. 1).

A power supply unit 105 provides individual transfer currents to the transfer backup rollers TR1, TR2, TR3, TR4, and TR5 respectively. A logic and control unit 230 (FIG. 1) includes one or more computers and in response to signals from various sensors associated with the electrophotographic printer apparatus 100 provides timing and control signals to the respective components to provide control of the various components and process control parameters of the apparatus in accordance with well understood and known employments. A cleaning station 101a for transport web 101 is also typically provided to allow continued reuse thereof.

With reference to FIG. 3 wherein a representative printing module (e.g., M1 of M1-M5) is shown, each printing module of the electrographic printer apparatus 100 includes a plurality of electrographic imaging subsystems for producing a single color toned image. Included in each printing module is a primary charging subsystem 210 for uniformly electrostatically charging a surface 206 of a photoconductive imaging member (shown in the form of an imaging cylinder 205). An exposure subsystem 220 is provided for image-wise modulating the uniform electrostatic charge by exposing the photoconductive imaging member to form a latent electrostatic color separation image of the respective color. A development station subsystem 225 serves for toning the image-wise exposed photoconductive imaging member with toner of a respective color. An intermediate transfer member 215 is provided for transferring the respective color separation image from the photoconductive imaging member through a transfer nip 201 to the surface 216 of the intermediate transfer member 215 and from the intermediate transfer member 215 to a receiver member (receiver member 236 shown prior to entry into the transfer nip and receiver member 237 shown subsequent to transfer of the toned color separation image) which receives the respective toned color separation images in superposition to form a composite multicolor image thereon.

Subsequent to transfer of the respective color separation images, overlaid in registration, one from each of the respective printing modules M1-M5, the receiver member is advanced to a fusing assembly to fuse the multicolor toner image to the receiver member. Additional necessary components provided for control may be assembled about the various process elements of the respective printing modules (e.g., a meter 211 for measuring the uniform electrostatic charge, a meter 212 for measuring the post-exposure surface potential within a patch area of a patch latent image formed from time to time in a non-image area on surface 206, etc). Further details regarding the electrographic printer apparatus 100 are provided in U.S. Publication No. 2006/0133870, published on Jun. 22, 2006, in the names of Yee S. Ng et al.

Associated with the printing modules 200 is a main printer apparatus logic and control unit (LCU) 230, which receives input signals from the various sensors associated with the printer apparatus and sends control signals to the chargers 210, the exposure subsystem 220 (e.g., LED writers), and the development stations 225 of the printing modules M1-M5. Each printing module may also have its own respective controller coupled to the printer apparatus main LCU 230.

Subsequent to the transfer of the five color toner separation images in superposed relationship to each receiver member, the receiver member is then serially de-tacked from transport web 101 and sent in a direction to the fusing assembly 60 to fuse or fix the dry toner images to the receiver member. The transport web is then reconditioned for reuse by cleaning and providing charge to both surfaces 124, 125 (see FIG. 2) which neutralizes charge on the opposed surfaces of the transport web 101.

The electrostatic image is developed by application of pigmented marking particles (toner) to the latent image bearing photoconductive drum by the respective development station 225. Each of the development stations of the respective printing modules M1-M5 is electrically biased by a suitable respective voltage to develop the respective latent image, which voltage may be supplied by a power supply or by individual power supplies (not illustrated). Preferably, the respective developer is a two-component developer that includes toner marking particles and magnetic carrier particles. Each color development station has a particular color of pigmented toner marking particles associated respectively therewith for toning. Thus, each of the five modules creates a different color marking particle image on the respective photoconductive drum. As will be discussed further below, a non-pigmented (i.e., clear) toner development station may be substituted for one of the pigmented developer stations so as to operate in similar manner to that of the other printing modules, which deposit pigmented toner. The development station of the clear toner printing module has toner particles associated respectively therewith that are similar to the toner marking particles of the color development stations but without the pigmented material incorporated within the toner binder.

With further reference to FIG. 1, transport belt 101 transports the toner image carrying receiver members to a fusing or fixing assembly 60, which fixes the toner particles to the respective receiver members by the application of heat and pressure. More particularly, fusing assembly 60 includes a heated fusing roller 62 and an opposing pressure roller 64 that form a fusing nip therebetween. Fusing assembly 60 also includes a release fluid application substation generally designated 68 that applies release fluid, such as, for example, silicone oil, to fusing roller 62. The receiver members carrying the fused image are transported seriatim from the fusing assembly 60 along a path to either a remote output tray, or is returned to the image forming apparatus to create an image on the backside of the receiver member (form a duplex print) for the purpose to be described below.

The logic and control unit (LCU) 230 includes a microprocessor incorporating suitable look-up tables and control software, which is executable by the LCU 230. The control software is preferably stored in memory associated with the LCU 230. Sensors associated with the fusing assembly provide appropriate signals to the LCU 230. In response to the sensors, the LCU 230 issues command and control signals that adjust the heat and/or pressure within fusing nip 66 and otherwise generally nominalizes and/or optimizes the operating parameters of fusing assembly 60 for imaging substrates.

Image data for writing by the printer apparatus 100 may be processed by a raster image processor (RIP), which may include a color separation screen generator or generators. The output of the RIP may be stored in frame or line buffers for transmission of the color separation print data to each of respective LED writers K, Y, M, C, and R (which stand for black, yellow, magenta, cyan, and red respectively and assuming that the fifth color is red). The RIP and/or color separation screen generator may be a part of the printer apparatus or remote therefrom. Image data processed by the RIP may be obtained from a color document scanner or a digital camera or generated by a computer or from a memory or network which typically includes image data representing a continuous image that needs to be reprocessed into halftone image data in order to be adequately represented by the printer. The RIP may perform image processing processes including color correction, etc. in order to obtain the desired color print. Color image data is separated into the respective colors and converted by the RIP to halftone dot image data in the respective color using matrices, which comprise desired screen angles and screen rulings. The RIP may be a suitably programmed computer and/or logic devices and is adapted to employ stored or generated matrices and templates for processing separated color image data into rendered image data in the form of halftone information suitable for printing.

Figure 5:
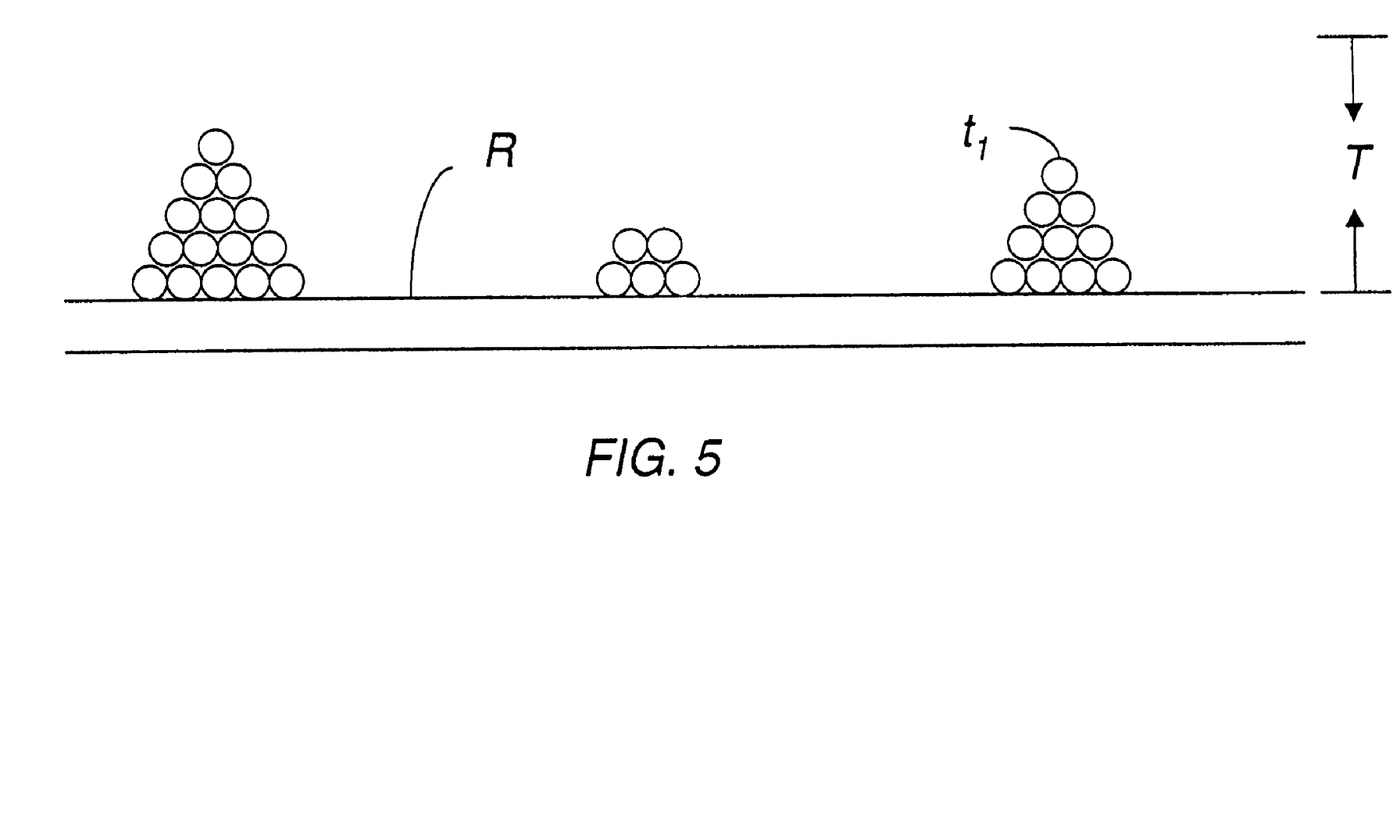
FIG. 5 is a schematic side elevational view, in cross section, of a receiver member having a marking particle print image formed thereon and, alternatively, similar size marking particles, in layers sufficient to form the tactile feel, raised information.
Figure 6:
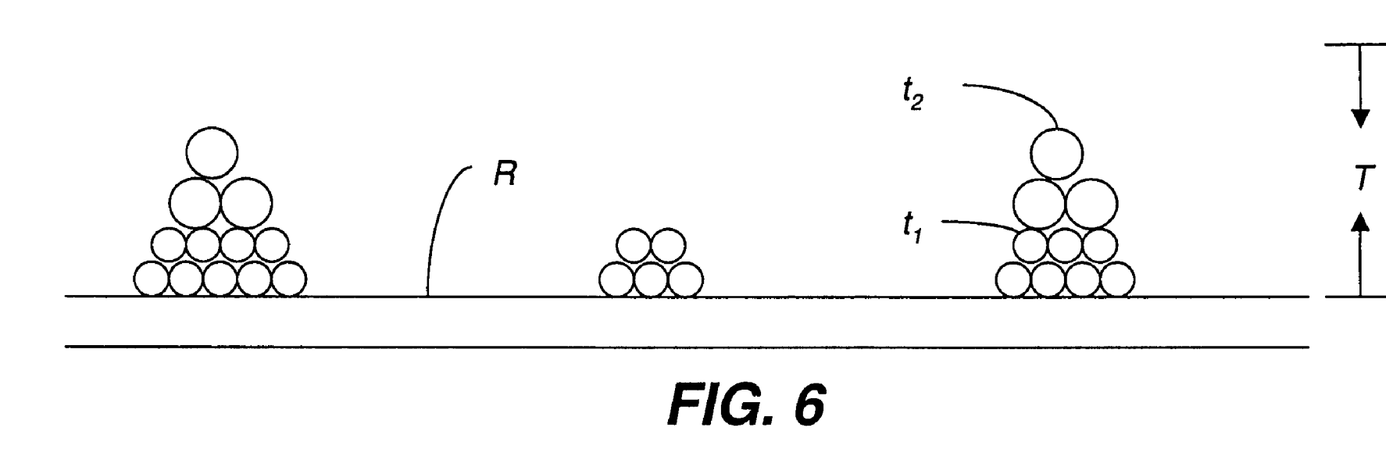
FIG. 6 is a schematic side elevational view, in cross section, of a receiver member having a marking particle print image formed thereon and larger size marking particles to form the tactile feel, raised information in the foreground of a print.
Figure 7:
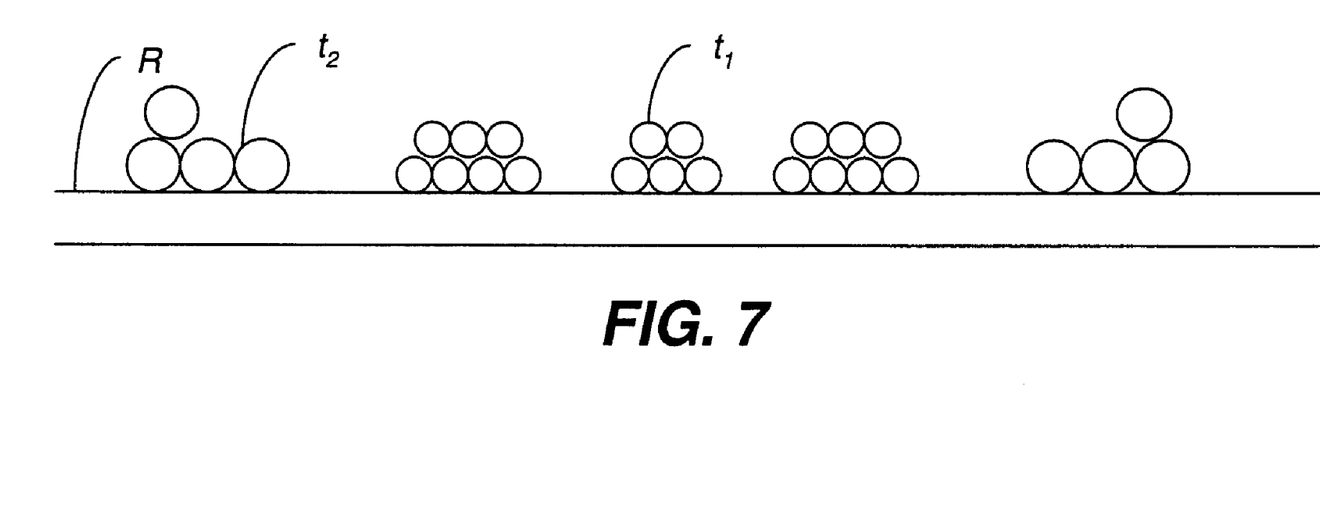
FIG. 7 is a schematic side elevational view, in cross section, of a receiver member having a marking particle print image formed thereon and larger size marking particles to form the tactile feel, raised information in the background of a print.

According to this invention, the desire to print raised letter information, with a resultant tactile feel, can be accomplished with an electrographic reproduction apparatus, such as the apparatus 100 discussed above by controlling the stack height T of toner particles t on a receiver member $R_n$ (see FIGS. 5-7). As discussed above, the raised letter information can have various applications such as for example providing foreground or primary images, such as Braille symbols, producing high quality printing such as stationary or business cards, giving documents a security feature, or providing background to images, such as desired surface characteristics for receiver members.

When printing raised information, especially when a substantially different size toner particle set is provided, in one electrographic module it may be advantageous to alter one or more electrographic process set-points, or operating algorithms, to optimize performance, reliability, and/or image quality of the resultant print. Examples of electrographic processes set-point (or operating algorithms) values that may be controlled in the electrographic printer to alternate predetermined values when printing raised information include, for example: fusing temperature, fusing nip width, fusing nip pressure, imaging voltage on the photoconductive member, toner particle development voltage, transfer voltage and transfer current. In an electrographic apparatus that makes raised information prints, a special mode of operation may be provided where the predetermined set-points (or control parameters or algorithms) are used when printing the raised information. That is, when the electrographic printing apparatus prints non-raised information images, a first set of set-points/control parameters are utilized. Then, when the electrographic printing apparatus changes mode to print raised information images, a second set of set-points/control parameters are utilized.

The basic premise for producing foreground raised information with a tactile feel is that the selected information will exhibit the desired tactile feel when the toner particle stack height T is at least 20 μm. The stack height T can be produced by selectively building up layer upon layer of toner particles to of a standard general average mean volume weighted diameter of less than 9 μm, where each layer has a lay down coverage of about 0.4 to 0.5 mg/cm$^2$ (see FIG. 5). When referring to toner particles, the toner size or diameter is defined in terms of the mean volume weighted diameter as measured by conventional diameter measuring devices such as a Coulter Multisizer, sold by Coulter, Inc. The mean volume weighted diameter is the sum of the mass of each toner particle multiplied by the diameter of a spherical particle of equal mass and density, divided by the total particle mass.

Alternatively, several layers of the standard size toner particles $t_1$ can be selectively covered in the desired raised information location with layers of toner particles $t_2$, of a larger general average mean volume weighted diameter of 12-30 μm (see FIG. 6). The larger toner particles are preferably clear (i.e., not pigmented) and have a lay down coverage of at least 2 mg/cm$^2$. Using small marking particles for the non-raised image is preferred because it allows for high quality images even when the large clear particles are deposited on top.

The raised print can also be used to impart a desired, more overall background texture to the image, as described in U.S. Publication No. 2006/0187505, published on Aug. 24, 2006, in the names of Yee S. Ng et al. That is, using variable data, for example, from a database for the raised information enables the variable data printing of tactile images wherein the background texture may, for example, provide the appearance of a painter's canvas, an acrylic painting, a basketball (pigskin), sandstone, sandpaper, cloth, carpet, parchment, skin, fur, or wood grain. The resultant texture is preferably periodic, but can be random or unique. It is also preferable to create textures with a low frequency screening algorithm.

Using variable data, for example from a suitable database, for the raised information enables every printed page to contain unique information, with its own particular tactile feel. In order to improve reproduction of the colors in areas containing raised image effect, it may be desirable to build a new color profile based on the raised information.

There are several ways in which fifth image data may be generated for raised printing. The fifth module image data can be generated by the digital front end (DFE) from original CMYK color data that uses the inverse mask technique of U.S. Pat. No. 7,139,521, issued Nov. 21, 2006, in the names of Yee S. Ng et al. The inverse mask for raised information printing is formed such that any rendered CMYK color pixel value with zero marking values will have a full strength (100%) fifth module pixel value generated. The fifth module image data is then processed with a halftone screen that renders a special texture. Accordingly, a special raised texture appearance will occur everywhere on the image (i.e., the foreground) where there is CMYK toner, but not in the background area.

In one alternative embodiment, a DFE can be utilized to store objects type information, such as text, line/graphics, image types to each rendered CYMK color pixels during raster image processing (RIPping). The fifth module imaging data will then be generated according to an operator's request to certain types of objects. For example, when only text object type is requested, the DFE will generate fifth image data only on the text object, while other object types will have zero values. This fifth image pixel will then be screened with halftone screens to generate the desired special texture. Here, the special raised texture will appear on the text objects while other objects will be normal (non-textured) in appearance.

In another alternative embodiment, the operator selected fifth image spot with special texture appearance is formed on top of CMYK/RGB image objects. The DFE renders fifth channel image data accordingly and sends the data to the press for printing. A special halftone screen (for example, a contone screen) in the press is configured to screen the fifth image data. As a result, the special texture will be printed with a raised appearance that conforms to the operator's choice.

In all of these approaches, a clear toner may be applied on top of a color image to form a three-dimensional texture. It should be kept in mind that texture information corresponding to the clear toner image plane need not be binary. In other words, the quantity of clear toner called for, on a pixel by pixel basis, need not only assume either 100% coverage or 0% coverage; it may call for intermediate "gray level" quantities, as well.

In an area of the colored image to be covered with a clear toner for three-dimensional texture, the color may change due to the application of the clear toner. For this approach, two color profiles are created. The first color profile is for 100% clear toner coverage on top, and the second color profile is for 0% clear toner coverage on top. On a pixel by pixel basis, proportional to the amount of coverage called for in the clear toner image plane, a third color profile is created, and this third color profile interpolates the values of the first and second color profiles. Thus, a blending operation of the two color profiles is used to create printing values. In a preferred embodiment, a linear interpolation of the two color profile values corresponding to a particular pixel is performed. It is understood, however, that some form of non-linear interpolation may be used instead. This technique is especially useful when the spatial frequency of the clear toner texture is low.

The second approach may be used when the spatial frequency of the clear toner texture is high. In such case, only one color profile may be needed for that textured image. One option is to simply use the ICC color profile of the original system for all textures, i.e., the ICC color profile that assumes there is no clear toner. In such case, we simply accept the fact that the appearance of the colored image will change a bit since the absolute color will differ from the calibrated color. However, there will not be an observable color difference within a uniform color region, even though the color is not quite accurate. A second option is to build a new ICC color profile with that particular three-dimensional clear toner texture surface. In this manner, the macro "color accuracy" problem is corrected, while the color artifact from pixel-to-pixel is not noticeable. Furthermore, a library of such texture-modified ICC color profiles may be built up over time for use whenever an operator wishes to add a previously defined texture to a profile, as discussed above. A computer software application implementing such a system may, for the second approach, automatically invoke just one of these two options, or may instead display a choice of the two options to an operator, perhaps with one of the options being the default.

The invention has been described in detail with particular reference to certain preferred embodiments thereof, but it will be understood that variations and modifications can be effected within the spirit and scope of the invention.

What is claimed is:

1. Electrographic printing wherein raised information, with a distinct tactile feel, can be printed by electrographic techniques, said printing comprising the steps of:
   forming a desired print image, by a selected electrographic technique, on a receiver member utilizing standard size pigmented marking particles;
   in an area of the formed print image, where desired tactile feel, raised information is to be formed, selectively forming such tactile feel, raised information by the same selected electrographic technique for forming said desired print image utilizing non-pigmented marking particles built up on top of the standard size pigmented marking particles substantially larger size than the standard size pigmented marking particles of the desired print image and fusing the built up toner particles; and
   wherein one or more electrographic process set-points, control parameters and algorithms, are set to predetermined values when printing tactile feel, raised information so that after the fusing of the built up toner particles form a relief pattern providing a tactile feel and wherein the set-points used when printing the tactile feel raised information are different from electrographic process set-points, control parameters or algorithms, used when printing an image without tactile feel, raised information and
   wherein the standard size pigmented marking particles have a volume average diameter of less than 9 µm, and the non-pigmented marking particles are on the order of a volume average diameter of 12-30 µm.

2. Electrographic printing according to claim 1 wherein the coverage by non-pigmented marking particles for a tactile feel, raised information is at least 2 mg/cm$^2$.

3. Electrographic printing according to claim 1 wherein a total marking particle stack height is at least 20 µm in order to yield the desired tactile feel.

4. Electrographic printing according to claim 1 wherein the tactile feel, raised information is used for the following: Braille and printing, providing security features, printing raised letter information such as business cards or stationary, or providing a surface characteristic for the print receiver member.

5. Electrographic printing according to claim 1 wherein the tactile feel, raised information imparts a periodic texture to the print image.

6. Electrographic printing according to claim 1 wherein the raised information is screened using a low frequency screening algorithm.

* * * * *